United States Patent [19]
Pugsley et al.

[11] 4,037,075
[45] July 19, 1977

[54] IMAGE REPRODUCTION SYSTEMS

[75] Inventors: Peter C. Pugsley, Pinner; Philip R. Kellner, Amersham, both of England

[73] Assignee: Crosfield Electronics Limited, London, England

[21] Appl. No.: 578,143

[22] Filed: May 16, 1975

[30] Foreign Application Priority Data

May 16, 1974 United Kingdom ............ 21847/74

[51] Int. Cl.² .................................................. G03F 1/00
[52] U.S. Cl. .......................... 219/121 LM; 346/76 L
[58] Field of Search ..... 219/121 L, 121 LM, 121 EB, 219/121 EM; 178/6.6 B; 346/76 L; 101/1, 426, 128.3, 128.4; 156/12, 253; 264/154

[56] References Cited

U.S. PATENT DOCUMENTS

| | | | |
|---|---|---|---|
| 3,181,170 | 4/1965 | Akin | 219/121 L X |
| 3,314,073 | 4/1967 | Becker | 219/121 L |
| 3,455,239 | 7/1969 | Smith | 219/121 LM |
| 3,549,733 | 12/1970 | Caddell | 219/121 LM X |
| 3,665,483 | 5/1972 | Becker et al. | 346/76 L |
| 3,668,028 | 6/1972 | Short | 219/121 L X |
| 3,786,224 | 1/1974 | Heywang et al. | 219/121 LM |
| 3,790,744 | 2/1974 | Bowen | 219/121 LM |
| 3,832,948 | 9/1974 | Barker | 219/121 LM |
| 3,851,382 | 12/1974 | Stork | 219/121 EM X |
| 3,860,783 | 1/1975 | Schmidt et al. | 219/121 EM |
| 3,911,444 | 10/1975 | Lou et al. | 346/76 L |
| 3,924,093 | 12/1975 | Feldman et al. | 219/121 LM |

FOREIGN PATENT DOCUMENTS

| | | | |
|---|---|---|---|
| 451,332 | 5/1968 | Switzerland | 219/121 EM |

Primary Examiner—Elliot A. Goldberg
Assistant Examiner—Clifford C. Shaw
Attorney, Agent, or Firm—Kemon & Estabrook

[57] ABSTRACT

In a method of preparing a screened reproduction, a laser beam modulated in an on-off manner scans a film or plate comprising a substrate resistant to the laser beam and a two-layer coating which is removed by the laser beam, after which correction is carried out by subjecting the image-defining coating dots to the action of a chemical agent. The coating layer adjacent the substrate is attacked by the chemical agent but the overlying coating layer is resistant to the chemical agent and protects the top surface of the first layer, permitting a reduction of the size of the coating dots without a reduction in their thickness.

2 Claims, 4 Drawing Figures

IMAGE REPRODUCTION SYSTEMS

In one known method of reproducing images, an image to be reproduced is scanned, element by element, by an analysing head which is such that light from a scanned element of the image falls on a photo-electric device within the head and this results in an electric signal the amplitude of which varies with the density of the scanned element of the image. This signal is used to modulate a light source scanning a photographic film in synchronism with the scanning of the original image by the analysing head. The photographic film is subsequently removed from the scanner and is photographically processed and used in the preparation of a printer. For the reproduction of coloured images, it is usual to generate three signals representing the red, green and blue colour components of the successively scanned elements of the original, and these signals are used to control the scanning of three respective films which are processed to form colour separations used in the preparation of the colour printers.

Where desired, the film or films can be exposed in a dot pattern to produce a screened reproduction, or screened colour separations.

A method according to the present invention for preparing a screened reproduction of an image, comprising scanning a laser beam, modulated in an on-off manner with the required screened-image densities of the image to be reproduced, over a film or plate comprising a substrate and a coating on which the beam is incident, the substrate being substantially less susceptible to the action of the laser beam than the coating, whereby the coating material is selectively removed to leave image-representing dots upstanding from the substrate, the method further comprising thereafter carrying out correction by subjecting the said upstanding image-representing dots to the action of a chemical agent, the said coating comprising a first layer on the substrate and a second layer which is superimposed on the first and is substantially more resistant to attack by the chemical agent than the first layer and thereby protects the underlying surface of the first layer, whereby the said image-representing dots are affected by the chemical agent from their side walls of first layer material inwards and their effective printing size is reduced.

The process thus permits "dot-etching" of the film or films produced by a scanner to enable local changes or corrections to be made. In this respect, it has the advantages of dot-etching by photographic reduction of a silver image by a suitable chemical agent, which partly dissolves the silver forming the dots and reduces their effective size. However, in conventional dot-etching, the density of silver in the dot is greater in the middle of the dot than at its edges and this permits the chemical agent to be applied overall and to reduce the effective size of the dots in proportion to the time for which it acts. Without the protective layer used in the present invention, a chemical agent acting on the areas left unaffected by the laser beam would cause each dot to become thinner over its whole area instead of being attacked primarily around its edge.

In the preferred method embodying the invention, the film or plate comprises a vacuum-metallised polyester laminated on the metallic side to a polyvinyl chloride film. The polyester constitutes the substrate, the vacuum-metallising constitutes the first layer and the polyvinyl chloride constitutes the second or protective layer.

In an alternative form, the first layer is constituted by a material including a dye or pigment to render it more susceptible to the action of the laser beam. However, we prefer the use of the metallic layer because the removal of metal during the dot-etching procedure can be much better controlled than the removal of a pigment or dye-containing plastics layer.

When a first layer including a dye or pigment is used, the chemical agent may be a bleaching agent which diffuses into the dye or pigment layer from the edges of the dots.

When an adequate reduction of dot area has been achieved, the film or plate is removed from the solution of chemical agent and is placed in a stop bath which stops the chemical action and thus prevents further reduction in dot size.

A dye or pigment may be incorporated in the protective layer to render it more susceptible to heating and decomposition by the laser beam.

Where a metallising layer is used, the metal may be bismuth or aluminium. A dye or pigment-containing layer may be constituted by a thin layer of a permeable material, such as gelatine, containing a pigment or suitably dyed with a dye which will cause the laser to absorb laser radiation. Pigmented polyvinyl chloride or cellulosic films may be used in place of a pigmented gelatine layer.

The substrate may be a polyester, as proposed above, or may be a polycarbonate film or a polyvinyl chloride film.

The protective layer may be a film of nylon or polyvinyl chloride or may be a polyester, bonded to the top of the first layer. Where the film or plate is to be used in a process employing exposure to ultra-violet and blue wavelengths, obviously the material selected for the substrate and the protective layers of the film or plate must be transparent to these wavelengths.

In order that the invention may be better understood, an example of a process embodying the invention will now be described with reference to the accompanying drawings, in which.

Figure 1:
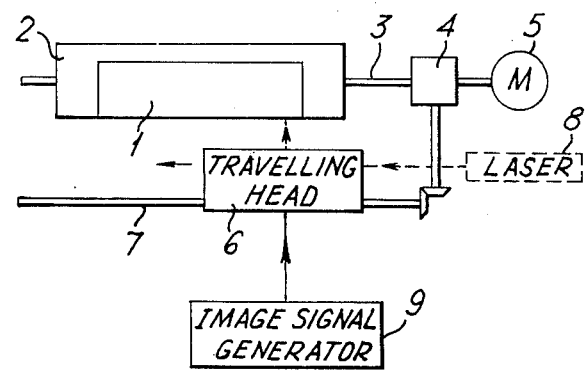
FIG. 1 shows diagrammatically apparatus which can be used to scan the laser beam over the surface of the film material.

In the arrangement shown in FIG. 1, the film material 1 to be scanned by the laser beam is wrapped around a cylinder 2 mounted on a shaft 3 which is driven, through a gearbox 4, by a motor 5. A travelling scanning head 6 is mounted on a lead screw 7 driven from the gear box 4 in such a manner that a beam directed from the travelling head towards the cylinder 2 scans the cylinder 2 in a helix of very fine pitch. The scanning beam is derived from a laser which may be mounted within the travelling head or, as indicated by the dotted-line laser 8 in the diagram, may be independently mounted, its beam being reflected within the travelling head. The laser beam is modulated by a signal from an image signal generator 9.

Figure 2:
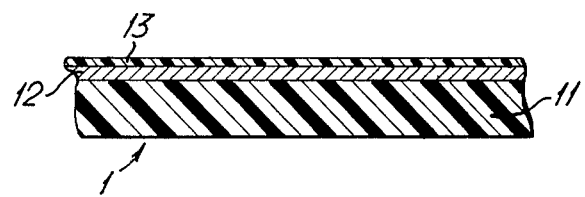
FIG. 2 shows a film material before scanning by the modulated laser beam.
Figure 3:
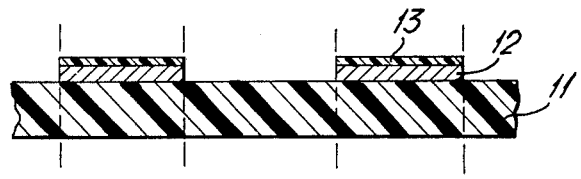
FIG. 3 shows the same material after scanning by the modulated laser beam.

As shown in FIG. 2, the film material of FIG. 1 comprises a substrate 11 and a coating comprising a layer 12 superposed on the substrate, and a protective layer 13. The layer 12 may consist of a pinhole-free bismuth or aluminium metallising layer or may be a pigment-containing or dye-containing layer, the metallising layer being preferred. The protective layer 13 is of a polymeric material which is rendered more absorbent at the laser wavelength by the addition of a dye or pigment. The substrate 11 is much less susceptible to the action of the laser beam than the materials of the coating layers. When the film material is subjected to scanning by the laser beam, modulated in an on-off manner, the layers 12 and 13 are selectively removed in the areas on which the beam is incident during scanning but the substrate 11 is substantially unaffected. Thus, after scanning the plate has a form such as that illustrated in FIG. 3, in which image-representing dots of the coating layer stand out from the substrate, each dot consisting of a layer 12 capped by a protective layer 13.

When the film material, or a portion thereof, is to be subjected to correction, there is applied to the surface, or the portion thereof to be corrected, a chemical agent which attacks the material of the layer 2 but does not substantially affect the substrate or the protective layer. In the case of an aluminium metallising layer, a dilute caustic solution can be used as a chemical etchant for dot etching. In the case of a bismuth metallising layer, a dilute nitric acid solution can be used. For a pigment-containing or dye-containing layer 2, a bleaching agent is suitable.

Figure 4:
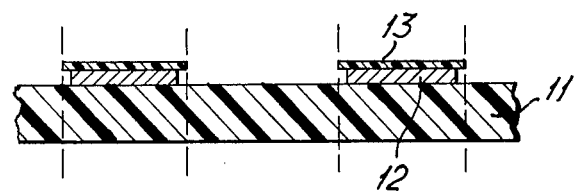
FIG. 4 shows the material of FIG. 3 after correction.

The effect of the chemical dot-etching on the film material described is shown in FIG. 4. Whilst the sides of the image-representing dots are etched away to reduce the dot dimension along the surface of the film material, the thickness of the image-representing dot, perpendicular to this surface, remains constant.

The metallising layer, or the dye-containing or pigment-comprising layer, is chosen to have sufficient absorption for it to be effective in preventing exposure of an offset plate where this layer remains in the printer film or plate after exposure and correction. Thus, the laser-generated image can be used directly in plate making.

Since the protective layer is substantially unaffected by the chemical etchant, the process of correction will cause the protective layer to project slightly beyond the sides of the corrected dot layer 12, as shown in FIG. 4. This overhang is of no importance, however, since the protective layer is chosen to be transparent in the ultra-violet and visible-light wavebands, or is so thin as to appear transparent at the light exposure levels employed when the film material is used in the preparation of an offset plate.

We employ a neodymium-YAG laser, which has a wavelength of about 1.06 microns. Laser powers of one quarter watt to three watts may be used for the process embodying the invention. If desired, for example to match the absorption properties of a dye or pigment to the laser wavelength, the output of the laser can be subjected to crystal frequency doubling to provide a wavelength of 530 nanometers, for example. As an alternative, an argon-ion laser operating at 480 nanometers can be used.

We claim:

1. A method of preparing a film or plate, for use in the preparation of a printing plate for providing a screened reproduction of an image, comprising the steps of:

scanning a laser beam over the film or plate, the film or plate comprising a substrate having a plane surface and a coating on which the laser beam is incident, the substrate being substantially less susceptible to the action of the laser beam than the coating;

modulating the laser beam in an on-off manner with the required screened-image densities of the image to be reproduced, whereby the coating material is selectively removed to leave only image-representing coating dots on the substrate;

and thereafter correcting the film or plate by subjecting the remaining image-representing coating dots to the action of a chemical agent;

and in which the said coating comprises a first layer on the substrate and a second layer which is superimposed on the first and is substantially more resistant to attack by the chemical agent than the first layer and thereby protects the underlying surface of the first layer, whereby the said image-representing dots are affected by the chemical agent from their side walls of the said first material inwards and their effective size is reduced.

2. A method of preparing a film or plate, for use in the preparation of a printing plate for providing a screened reproduction of an image, comprising the steps of:

scanning a laser beam over the film or plate, the film or plate comprising a substrate having a plane surface and a coating on which the laser beam is incident, the substrate being substantially less susceptible to the action of the laser beam than the coating;

modulating the laser beam in an on-off manner with the required screened-image densities of the image to be reproduced, whereby the coating material is selectively removed to leave only image-representing coating dots on the substrate;

and thereafter correcting the film or plate by subjecting the remaining image-representing coating dots to the action of a chemical agent;

and in which the said coating comprises a first layer on the substrate and a second layer which is superimposed on the first and protects the underlying surface of the first layer, the first layer including a pigment or dye and the chemical agent being a bleaching agent which bleaches the pigment or dye in the first layer of the image-representing coating dots, whereby the said image-representing dots are affected by the chemical agent from their side walls of the said first material inwards and their effective size is reduced.

* * * * *